(12) United States Patent
Pourbigharaz et al.

(10) Patent No.: US 7,650,552 B2
(45) Date of Patent: Jan. 19, 2010

(54) APPARATUS AND METHOD FOR DETECTING AND RECOVERING ERRORS CAUSED BY ELECTROSTATIC DISCHARGE

(75) Inventors: Fariborz Pourbigharaz, Thornhill (CA); Milivoje Aleksic, Richmond Hill (CA); Carl Mizuyabu, Thornhill (CA); Aris Balatsos, Toronto (CA); Zeeshan Syed, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 11/278,199

(22) Filed: Mar. 31, 2006

(65) Prior Publication Data

US 2007/0250750 A1    Oct. 25, 2007

(51) Int. Cl.
*G01R 31/28* (2006.01)
(52) U.S. Cl. ...................................................... 714/733
(58) Field of Classification Search .................. 714/733
See application file for complete search history.

(56) References Cited

U.S. PATENT DOCUMENTS

| | | | | |
|---|---|---|---|---|
| 5,283,792 A | * | 2/1994 | Davies et al. ................. | 714/22 |
| 5,835,327 A | * | 11/1998 | Siew et al. ................... | 361/111 |
| 5,872,790 A | * | 2/1999 | Dixon ......................... | 714/703 |
| 6,480,975 B1 | * | 11/2002 | Arimilli et al. ................ | 714/52 |
| 6,775,112 B1 | * | 8/2004 | Smith et al. ................... | 361/18 |
| 7,009,404 B2 | * | 3/2006 | Wendel et al. ............... | 324/525 |
| 7,233,452 B2 | * | 6/2007 | Kondou ....................... | 360/31 |
| 7,269,772 B1 | * | 9/2007 | Li et al. ....................... | 714/733 |
| 2002/0097805 A1 | * | 7/2002 | Casper et al. ................ | 375/257 |
| 2007/0058437 A1 | * | 3/2007 | Schaffer ................ | 365/185.23 |

* cited by examiner

*Primary Examiner*—James C Kerveros
(74) *Attorney, Agent, or Firm*—Christopher J. Reckamp; Michael J. Dehaemer, Jr.

(57) ABSTRACT

A method and apparatus for detecting an error compares a hardwired reference value to a corresponding predetermined value and generates an error indication in response to a change in the predetermined value. In one embodiment, the predetermined value is set to be the same as the hardwired reference value and in response to an electrostatic discharge event or any other suitable cause of error, the predetermined value changes so that a comparison indicates that an error has occurred. An error indication is then generated which may be, for example, an interrupt to recovery logic that generates recovery control information to reset a functional block that was corrupted or to perform in an entire chip reset if desired.

18 Claims, 5 Drawing Sheets

APPARATUS AND METHOD FOR DETECTING AND RECOVERING ERRORS CAUSED BY ELECTROSTATIC DISCHARGE

FIELD OF THE INVENTION

The invention relates generally to error detection and recovery circuits and methods that can detect errors caused by electrostatic discharge or other causes of malfunction and recover therefrom.

BACKGROUND OF THE INVENTION

Electrostatic discharge (ESD) or other causes of error can cause a variety of problems in handheld devices such as cellular phones, camcorders, MP3 players, DVD players, or any other suitable portable device. Many such devices may incorporate multiple integrated circuits such as a main processor and various coprocessors. For example, cell phones that employ cameras may include, for example, multiple integrated circuits. By way of example, a graphics and multimedia coprocessor such as an Imageon™ sold by ATI Technologies Inc., 1 Commerce Valley Drive, Markham, Ontario, Canada, may be used with other suitable coprocessors or processors. High energy ESD pulses generated by the human body or other source can cause LCD panel images to get corrupted, flicker, freeze, fade, or cause other malfunctions in the apparatus when such coprocessors are effected by ESD events.

In the instance where the handheld device includes telephone circuitry, such as cell phone, ongoing calls can be dropped or the device may not respond to a user pressing keypads or activating another user interface. Susceptibility to electrostatic discharge damage can impact market capture and revenues generated by handheld device manufacturers. Therefore, ESD detection and recovery mechanisms have become increasingly important.

Some known techniques for detecting malfunctions caused by ESD or other cause include, for example, a host processor such as a CPU that utilizes a software driver executing thereon to poll critical registers of critical operational blocks within a separate processor. For example, a status register of an external processor may be polled by the CPU via one or more suitable bus interfaces. Status bits such as phase lock loop clock enable bits can be monitored. If the bits show that the clocks have been disabled, the CPU determines that an ESD condition has occurred. However, such a system can be costly in handheld devices in terms of the power usage since the host processor needs to be used for the detection operation.

In addition, systems also typically rely on the host processor interface to also not be susceptible to this same ESD event that caused the problem in the coprocessor. To recover from the detected ESD event, the host processor typically updates the important registers with, for example, an image of the registers stored in system memory, or issues a software reset or a hardware reset to the corrupted subsystem.

In some systems, the system may also automatically update critical registers every few seconds with a stored backup of the information to provide an automatic recovery mechanism even though no error occurred. However, this can utilize unnecessary amounts of power when the device is battery powered. Also, such systems often do not provide any detection mechanism.

Another solution may be to have the host processor monitor external signals on a bus, for example, as opposed to looking at registers in the coprocessor and then generating a coprocessor reset when the CPU detects unexpected information on the external signals on the bus or other pin. However, such systems will not detect all corruption cases since only a few of them would result in external pin state changes.

Accordingly, an improved error detection apparatus and/or recovery apparatus that overcame one or more the above drawbacks would be desirable.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, a method and apparatus for detecting an error compares a hardwired reference value to a corresponding predetermined value and generates an error indication in response to a change in the predetermined value. In one embodiment, the predetermined value is set to be the same as the hardwired reference value and in response to an electrostatic discharge event or any other suitable cause of error, the predetermined value changes so that a comparison indicates that an error has occurred. An error indication is then generated which may be, for example, an interrupt to recovery logic that generates recovery control information to reset a functional block that was corrupted or to perform in an entire chip reset if desired.

In another example, an integrated circuit includes a plurality of functional blocks, such as, but not limited to, power supply circuits, clock generation circuits, 2D/3D graphics engines, video engines, audio engines, or any other suitable functional blocks for which error detection is desired. A circuit that detects an error is associated with each functional block so a per-functional block detection and recovery operation can be performed.

In another embodiment, a hardwired register contains a hardwired value that is compared to a reference value stored in a temporary register that is not hardwired. Both registers are located in suitable proximity to functional circuitry associated with a functional block of circuits and if the functional circuitry experiences an ESD event or other corruption event, the contents of the temporary register may also get corrupted but the contents of the hardwired register are immune from the corruption event. When the two values no longer match, an error event is detected and the suitable recovery of the functional block, plurality of functional blocks, or entire integrated circuit for example may be attempted. It is desirable that the semiconductor gates used as the temporary register value are also similar in thickness to gates used in the functional block so that the temporary register is susceptible and reacts in a similar manner as gates in the functional block.

The error detection circuit may be employed in any suitable apparatus such as an integrated circuit, portable device, handheld device, such as a cell phone, PDA, Internet appliance, or any other suitable apparatus as desired. When multiple error detection circuits are employed, an error status register is also maintained with bits indicating those functional blocks that experienced the corruption event. In one example, multiple functional blocks on an integrated circuit each employs a separate error detection circuit. However, any suitable number of error detection circuits may be employed as desired.

Figure 1:
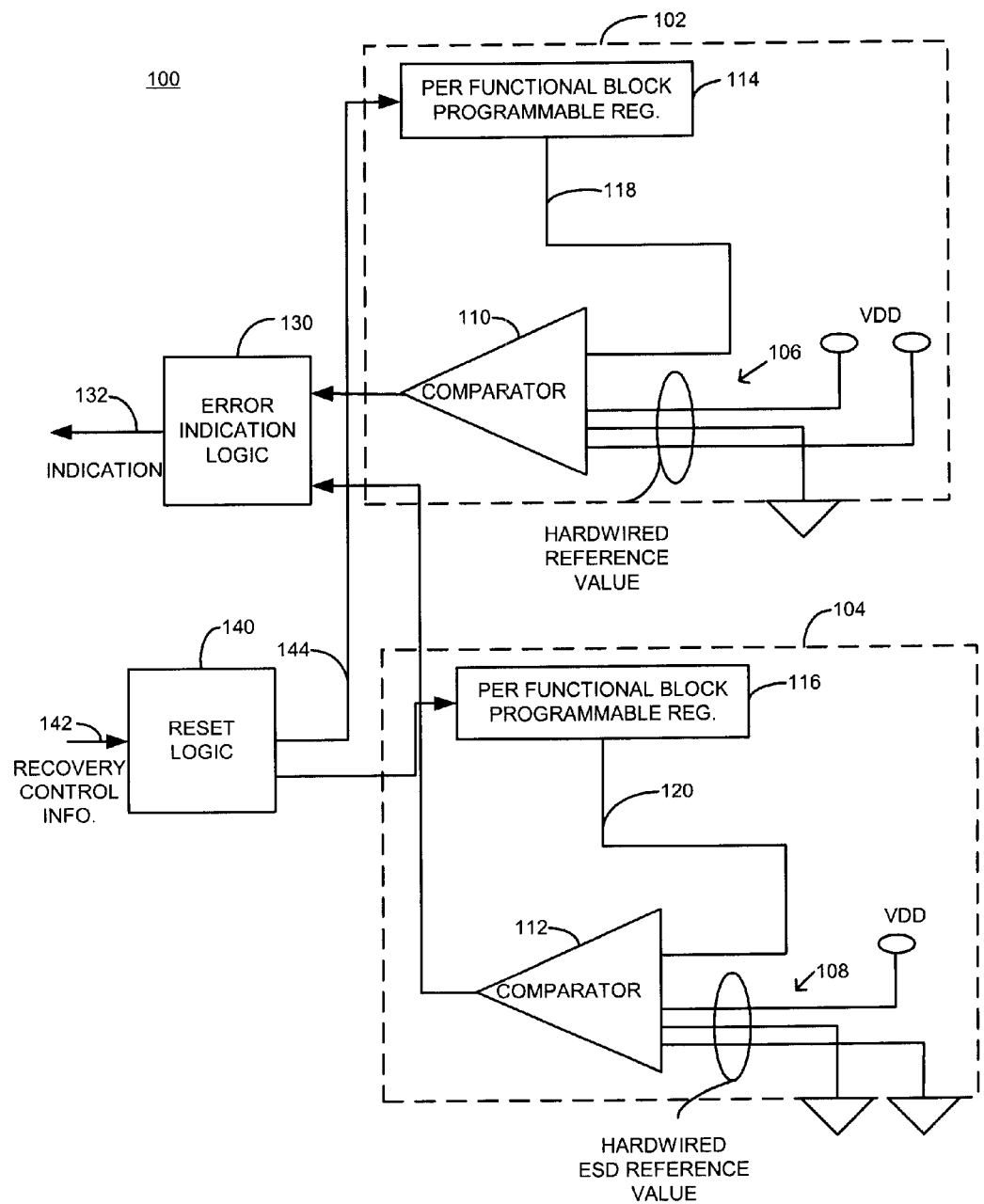
FIG. 1 is a block diagram illustrating one example of a plurality of circuits for detecting an error in accordance with one embodiment of the invention.

FIG. 1 illustrates one example of an integrated circuit 100 that employs a plurality of circuits for detecting an error 102 and 104. The error may be caused by an electrostatic discharge event, electromagnetic interference, or any other cause of operational error. It will also be recognized that the integrated circuit 100 may utilize a single circuit for detecting an error or multiple circuits for detecting an error wherein each circuit may be duplicated for each relevant functional block of circuits employed on the integrated circuit 100. For purposes of illustration only, and not limitation, the integrated circuit 100 will be referred to as a processor such as a DSP, CPU, video/graphics processor, or any process that processes digital and/or analog information. Each circuit for detecting an error 102 and 104 employs a hardwired reference value circuit 106 and 108 respectively that provides a hardwired reference value to comparator logic 110 and 112. In this example, three inputs to a comparator are used to designate a hardwired reference value. For hardwired reference value circuit 106, two lines are tied to VDD and another to ground whereas the hardwired reference value circuit 108 has two lines tied to ground and one to VDD. However, any suitable number of bits may be utilized and any suitable structure for the hardwired reference value circuit may be employed. Since the hardwired reference value circuits 106 and 108 employ lines that are tied directly to VDD or ground they are relatively immune from ESD events or other corruption events.

Each circuit for detecting an error 102 and 104 also includes a corresponding predetermined value circuit 114 and 116 that each provide a predetermined value 118 and 120 to another input or inputs of the comparator logic 110 and 112 respectively. In this example, the predetermined value circuits 114 and 116 are configured as programmable registers that store bits representing the values 118 and 120. The hardwired reference values 106 and 108 may be set as random values when the integrated circuit 100 is manufactured or at any suitable time and may be suitably tied to VDD or ground as desired. The corresponding predetermined values 118 and 120 that are stored in the predetermined value circuits 114 and 116 are also set to be equal to the hardwired values 106 and 108 so that the output of the comparator logic 110 and 112 indicates when a difference occurs. When an ESD event or other event causes an undesired change to the predetermined values stored in the programmable registers 114 and 116, the comparator logic 110 and 112 indicates that the values no longer match and detects an error event. Each predetermined value is the same value as a corresponding hardwired reference value during normal operation.

The integrated circuit 100 also includes error indication logic 130 operatively coupled to receive as input, output from the respective comparator logic 110 and 112. The error indication logic 130 generates an error indication 132 in response to a change in the predetermined values 118 and 120. Depending upon the desired application, the indication 132 may be, for example, an interrupt sent to another processor, or may be a bit set in a register as further described below or may be any other suitable error indication information.

Each circuit for detecting an error 102 and 104 may be located in a respective functional block on the integrated circuit 100 so that each functional block may be separate error detection logic to provide multi-functional block error detection. As such, the integrated circuit 100 includes a plurality of functional blocks wherein multiple functional blocks may include a respective circuit for detecting an electrostatic discharge event or any other suitable error event. The error indication logic 130 in this example, serves as multi-functional block error detection status logic that, for example, provides data representing which of the plurality of functional blocks detected an error event based on a respective circuit for detecting the error. The error indication logic 130 may be a register, for example, or any other suitable logic and the error indication 132 may be one or more bits in the register or may be any other suitable information.

The integrated circuit 100 also includes reset logic 140 that is responsive to recovery control information 142 that may be provided, for example, by a different processor within or external to the integrated circuit 100 or other suitable logic and resets the predetermined values 118 and 120 to their original value in response to the recovery control information 142. In one example, the reset logic 140 may simply be logic that reprograms the programmable registers 114 and 116 with the original predetermined values 118 and 120 that were present in the programmable registers during normal operation. Accordingly, after an error is detected in the integrated circuit, the reference values then are reprogrammed to their original values as part of a reset operation since they were corrupted due to an ESD event or other suitable event. The reset logic 140 may also perform conventional reset operations as known in the art.

Figure 2:
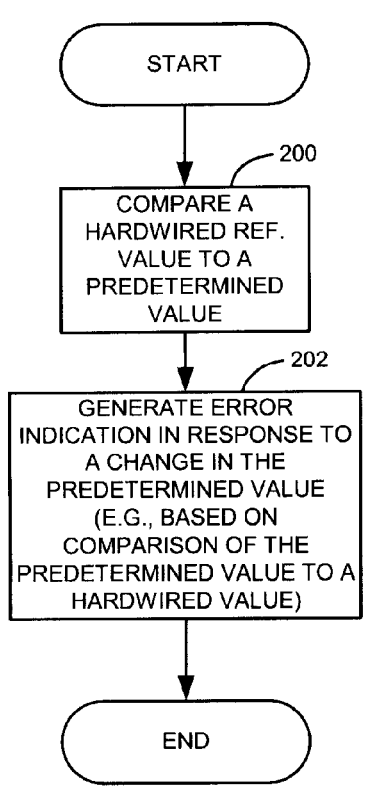
FIG. 2 is a flowchart illustrating one example of a method for detecting an error in accordance with one embodiment of the invention.

FIG. 2 illustrates a flowchart of one example of a method for detecting an error in accordance with one embodiment of the invention. In this example, the method may be carried out by either of the circuits 102 or 104 for detecting an error, or any other suitable structure. As shown in block 200, the method includes comparing a hardwired reference value to a corresponding predetermined value. As shown in block 202, the method includes generating an error indication, such as error indication 132 in response to a change in the predetermined value. The generation of the error indication 132 may be based on a comparison of the predetermined value 118 to the hardwired reference value provided by the hardwired reference value circuit 106. The error indication may be an interrupt or other suitable indication. The method may also include resetting the predetermined value to detect a subsequent error by, for example, reprogramming the programmable register 114 with the original predetermined value that was programmed in the programmable register prior to the error event. The programmable register 114 may be programmed with the same value as the hardwired value, for example, when the integrated circuit is manufactured, or at any other suitable time. It will be recognized that a simple latching circuit may also be used so that the hardwired reference value is latched into the programmable register 114 in response to the reset logic issuing reset control information 144. However, any suitable technique may be employed. The generated error indication 132 may be based on the comparison and is generated when the predetermined value and the hardwired reference value do not match.

Figure 3:
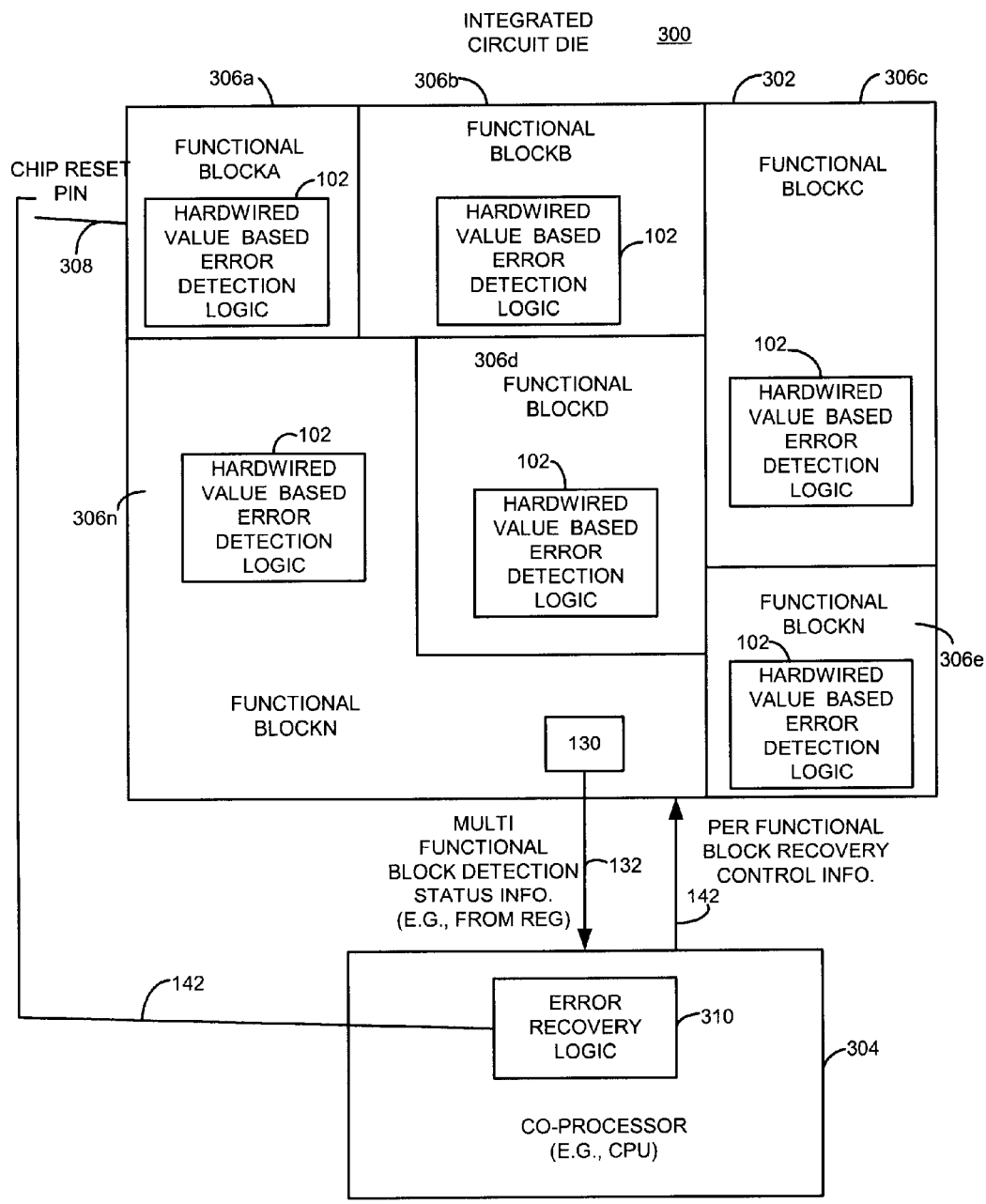
FIG. 3 is a block diagram illustrating one example of an integrated circuit that employs a plurality of error detection circuits in accordance with one embodiment of the invention.

FIG. 3 is a block diagram illustrating an integrated circuit 300 that employs a plurality of processors 302 and 304. For example, the processor 302 may be, for example, a video graphics processor or graphics multimedia processor or any other suitable processor and the processor 304 may be a coprocessor such as a host processor or any other suitable processor. The integrated circuit 300 may be utilized in a portable device such as a cell phone, video player, camcorder, printer, or any other suitable device that may also include if desired, input/output device and a display operatively coupled to the processor 302 if the processor is, for example, a graphics and multimedia processor or other processor that outputs information for display. As shown, the processor 302 includes a plurality of different functional blocks located throughout the integrated circuit designated generally as 306a-306n. The integrated circuit may also include a reset pin 308. Each functional block 306a-306n, in this example, includes hardwired value based error detection logic such as circuit 102. The processor 302 also includes the error indication logic 130 that provides the error indication 132 (e.g. an interrupt) to the processor 304. Each of the circuits for detecting an error 102 outputs an indication from comparator 110 when an error is detected.

The processor 304 includes error recovery logic 310, such as interrupt handling logic or any other suitable logic that provides recovery control information 142 to reset logic 140 on the processor. As also shown, the recovery control information 142 may be provided to the chip reset pin 308 to toggle the pin to reset the entire processor 302 even if only one functional block has detected an error. The error recovery logic 310, in response to the error indication 132, attempts recovery of at least one of the functional blocks 306a-306n, the entire processor, or any group of functional blocks in response to the generated error indication 132. In one example, the error indication 132 may include, for example, an interrupt. The error recovery logic 310 generates the recovery control information 142 to reset a particular functional block, namely the functional block that detected the error, or reset the entire processor 302 globally if desired.

As shown in this example, a different processor receives the error indication 132 and then attempts recovery of the other processor through reset logic 140 located in the processor 302. As noted above, the reset logic 140 can be any suitable reset logic that resets a particular functional block in any suitable manner and also resets the predetermined value to its original value if it was changed due to an ESD event or any corrupting event.

Figure 4:
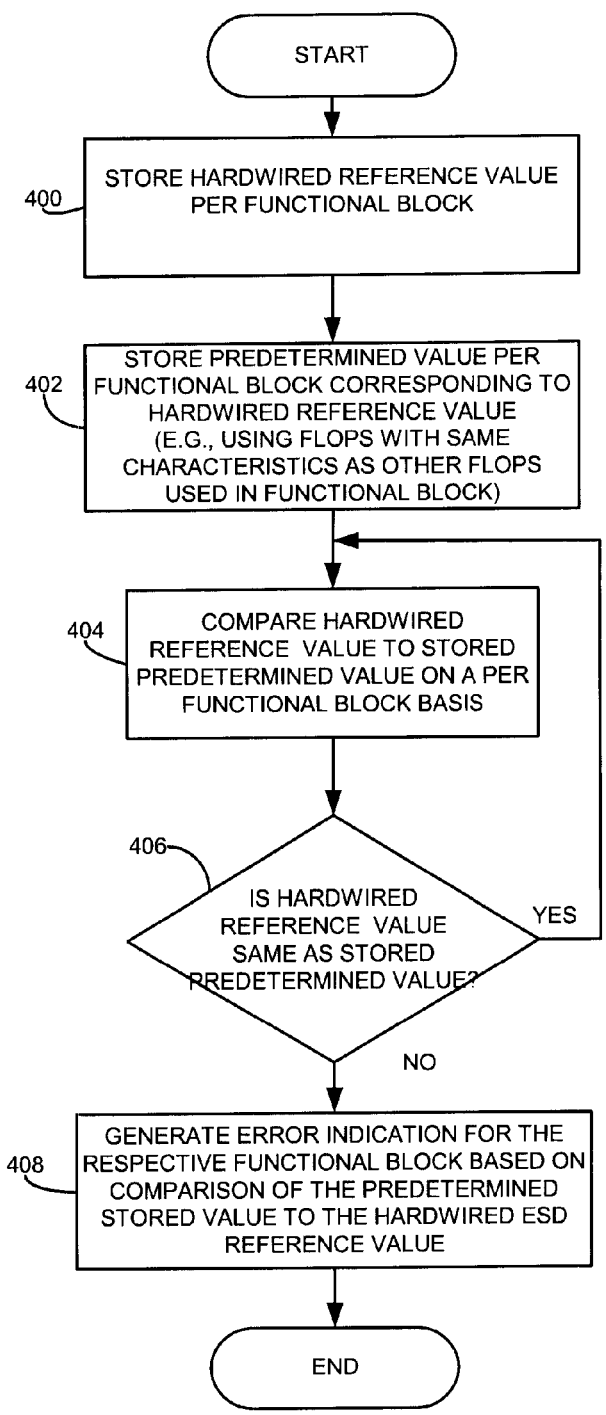
FIG. 4 is a flowchart illustrating one example of a method for detecting an error in accordance with one embodiment of the invention.
Figure 5:
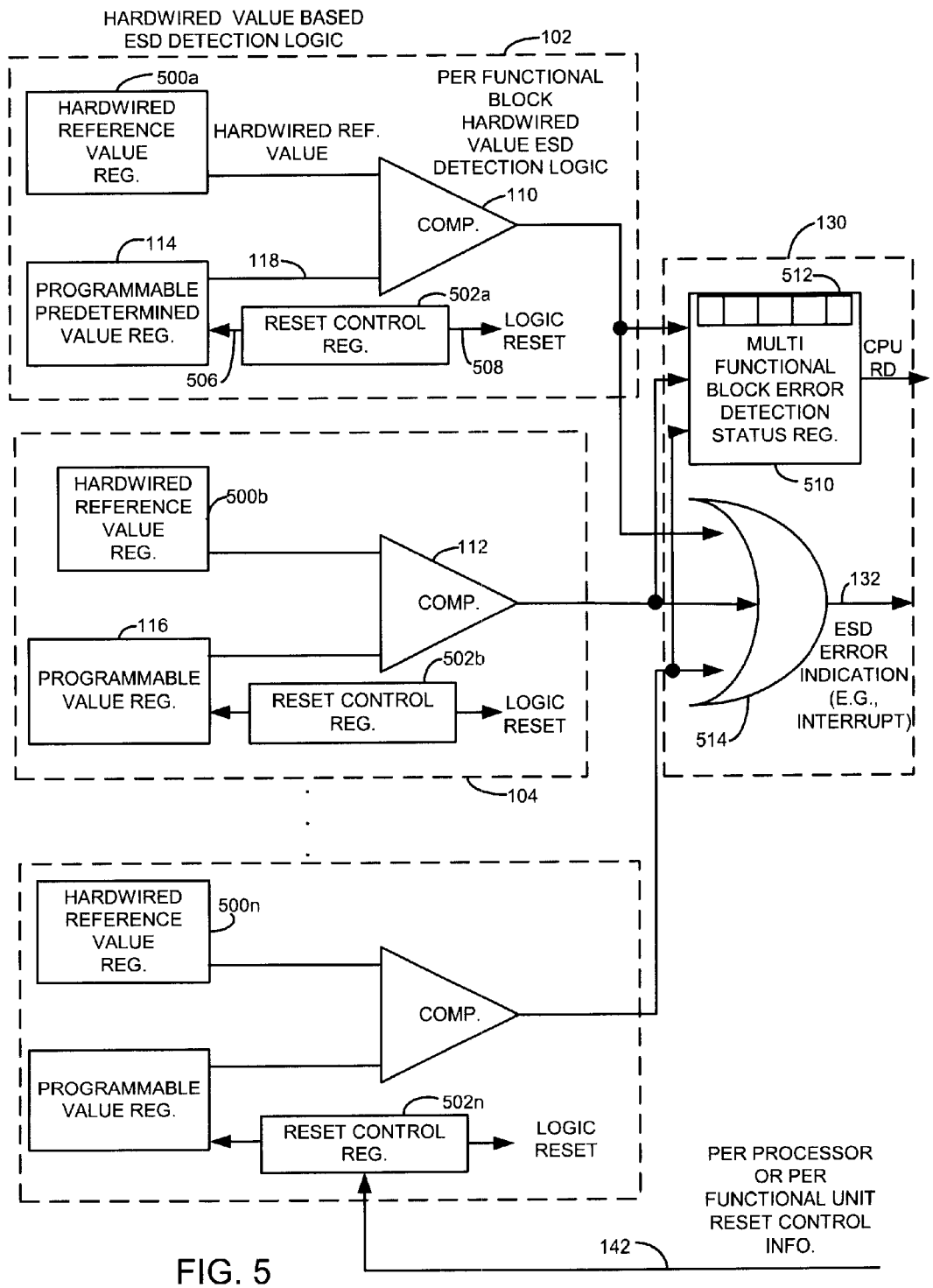
FIG. 5 is a block diagram illustrating one example of an integrated circuit that employs a plurality of error detection circuits in accordance with one embodiment of the invention.

Referring to FIGS. 4 and 5, a method and apparatus are shown wherein instead of the hardwired configuration shown in FIG. 1, a hardwired reference value register 500 (FIG. 5) is employed. For example, bits in a hardwired register 500a-500n may be fused when the chip is manufactured to a predetermined value using conventional fusing techniques. The configuration of FIG. 5 shows a type of register based implementation. A reset control register 502a-502n for each respective functional block provides the predetermined reset value 506 as well as logic reset control signal 508 to reset other logic in the functional block. The circuit is repeated for each desired functional block. The reset control register 502 may be accessed by the reset logic 140 or may be directly accessible, for example, by another processor that attempts recovery of the particular functional block. In this example, three circuits for detecting an error are shown. However, it will be recognized that any suitable number may also be employed. The reset value 506 is a value that matches the corresponding hardwired error reference value.

The error indication logic 130 is also shown in this example to include multi-functional block error detection status logic 510 which in this example is a register but may be any suitable memory structure or may be implemented in any suitable manner. The multi-functional block error detection status logic contains data representing error detection status for a plurality of functional blocks in, for example, a processor or multi processors or any other suitable integrated circuit. In this example, the data represents which of a plurality of functional blocks have detected an error event based on respective circuits for detecting the error event. By way of example, a register 512 may have a bit set for whichever circuits 102, 104 have detected an error so that a second processor can poll this information to determine how to best effect recovery. For example, if a primary functional block has detected an error, the error recovery logic may decide to perform an entire chip reset as opposed to a functional block based reset. However, if a particular functional block has detected an error, the error recovery logic may decide to attempt per-functional block recovery first prior to performing a complete chip recovery operation. In this example, the error indication logic 130 also includes OR logic 514 which receives output from the comparator logic 110, 112 and other comparator logic of each of the error detection circuits in each of the functional blocks and issues an error indication 132 if any one of the circuits has detected an error. As shown in FIG. 4, a method for detecting error may include, for example, as shown in block 400, storing a hardwired reference value on a per-functional block basis in, for example, a hardwired reference value register 500a-500n when the integrated circuit or device is manufactured, or at any other suitable time. The flops used in the programmable predetermined value register 114 preferably have the same characteristics as other flops used in the corresponding functional block in which the circuit 102 is placed so that if an ESD event or other error event occurs to the functional block circuits and logic, it is likely that the programmable predetermined value register 114 will also be effected in the same manner thereby indicating a suitable error detection. As such, in block 402, the method includes storing the predetermined value on a per-functional block basis corresponding to the hardwired reference values. These values match during normal operation and indicate that no error has occurred.

As shown in block 404, the method includes comparing hardwired reference values to the stored error detection values on a per-functional block basis, such as by the respective comparator logic. As shown in block 406, the method includes determining if the hardwired reference value is the same as the stored predetermined value. If so, no error is detected. However, if the values do not match, it is determined that an error has been detected and the method includes, as shown in block 408, generating an error indication for the respective functional block based on a comparison of the predetermined stored value to the hardwired error reference value corresponding to that particular functional block. This value may then be passed to the OR gate 514 and also if desired placed in a multi-functional block error detection status register 510 so that error recovery logic 310 can determine which of the functional blocks generated the error and detected the error. The error recovery logic 310, in response to the indication, attempts recovery of the functional block in response to the generated error indication associated with a given functional block. The error recovery logic generates recovery control information to reset a particular functional block, group of functional blocks, or entire processor if desired.

The method may include, for example, comparing, for each of a plurality of functional blocks in an integrated circuit, a hardwired reference value to a corresponding predetermined reference value, and generating an indication, on a per-functional block basis, in response to a change in the corresponding predetermined value for a given functional block. For a functional block that caused the error indication, the method includes resetting the corresponding predetermined value by, for example, issuing the reset information 506 or in any other suitable manner to reset the value to match the hardwired reference value in response to a functional block recovery attempt. This may be done by the error recovery logic 310 issuing the recovery control information 142 or in any suitable manner.

Figure 6:
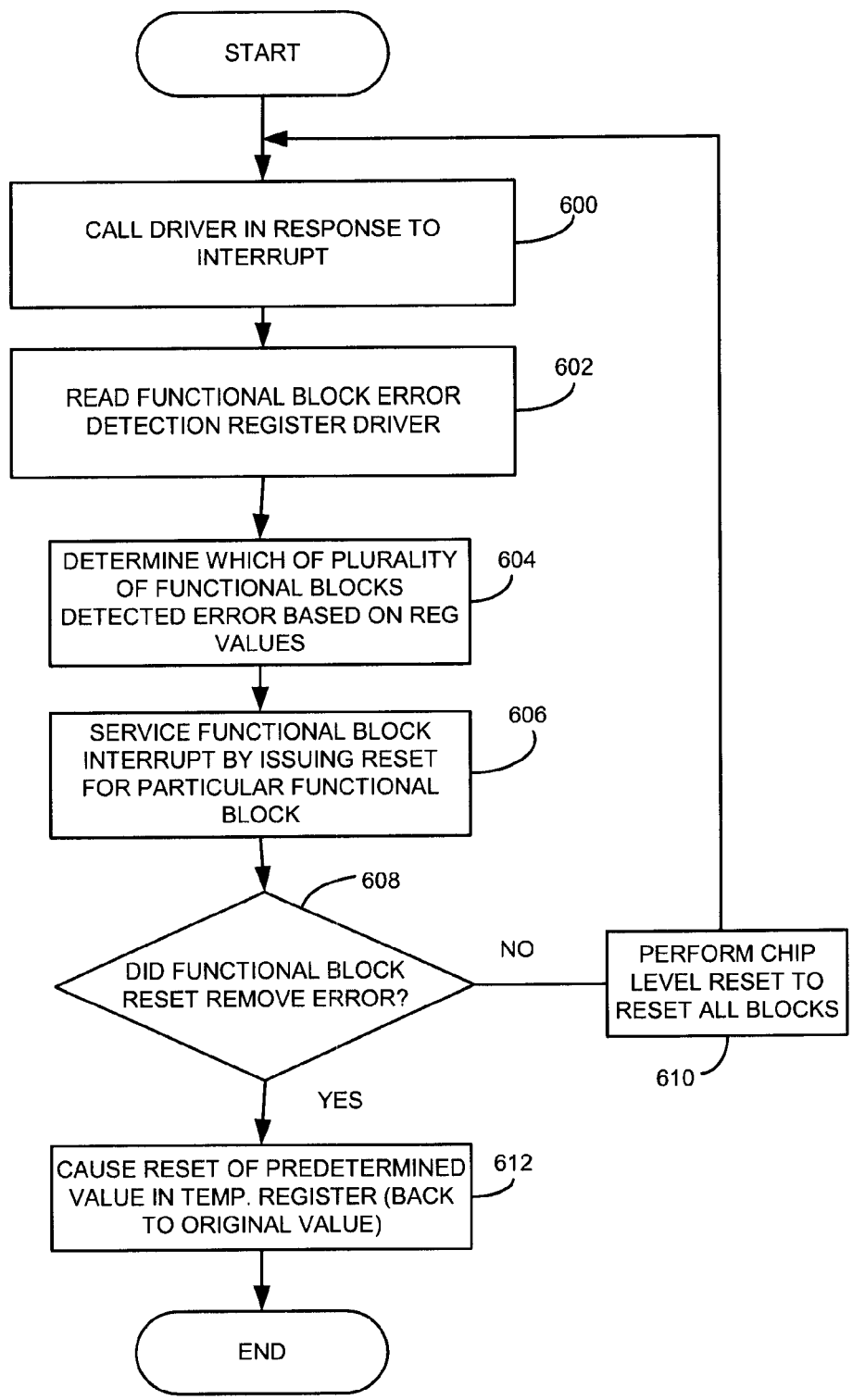
FIG. 6 is a flowchart illustrating one example of a method for recovering from an error in accordance with one embodiment of the invention.

FIG. 6 illustrates a method for recovering from an error. This method may be employed, for example, in a system that employs a plurality of processors that execute software that is stored in suitable memory including, for example, a driver that interfaces with an application or any other suitable code. As shown in block 600, the method may include, calling a driver in response to an interrupt. Accordingly, this method may be carried out, for example, by the error recovery logic 310 or any other suitable recovery logic. The error recovery logic 310 may call a driver in any suitable fashion in response to receiving the error indication 132. The method includes reading the functional block error detection status register 512 utilizing the driver as shown in block 602. As shown in block 604, the method includes determining which of the plurality of functional blocks detected the error based on the values in the multi-functional block error detection status register 512. As shown in block 606, the method includes servicing the functional block interrupt by issuing a reset for a particular functional block whose bit was set, for example, in the error detection status register 512. As shown in block 608, the error recovery logic may also determine if the reset that was issued for a given functional block removed the error. If not, as shown in block 610, the method includes performing a chip level or processor level reset to reset all functional blocks in a processor or chip. However, if the functional block reset did remove the error, the method, as shown in block 612, includes causing reset of predetermined value in the temporary programmable predetermined value register 114 to its original value prior to the error indication, which is equal to the relevant hardwired value. The method may then continue as desired.

Among other advantages, a method and apparatus detects errors caused by ESD events or other events and can do so in a cost effective manner. The apparatus and method can provide error detection on a functional block basis for basically any type of circuit. Other advantages will be recognized by one of ordinary skill in the art.

It will also be recognized that the above description describes mere examples and that other embodiments are envisioned and covered by the appended claims. It is therefore contemplated that the present invention cover any and all modifications, variations or equivalents that fall within the spirit and scope of the basic underlying principles disclosed above and claimed herein.

What is claimed is:

1. A method for detecting an error comprising:
   comparing, in an integrated circuit, a hardwired reference value to a corresponding predetermined value provided by a corresponding predetermined value circuit of the integrated circuit;
   generating, in the integrated circuit, an error indication based on the comparison that detects a difference between the hardwired reference value and the predetermined value; and
   performing, in the integrated circuit, a recovery process to recover a functional block in response to the generated error indication.

2. The method of claim 1 comprising; resetting the predetermined value to detect a subsequent error.

3. The method of claim 1 wherein the predetermined value is the same value as the hardwired reference value during normal operation and wherein generating the error indication based on the comparison comprises generating the error indication when the predetermined value and the hardwired reference value do not match.

4. The method of claim 1 wherein the hardwired reference value and the predetermined value are associated with one of a plurality of functional blocks in the integrated circuit and where the method further comprises performing the recovery process to recover the functional block in response to the generated error indication associated with the functional block.

5. The method of claim 4 wherein the error indication comprises an interrupt and wherein performing recovery of the functional block comprises generating recovery control information to reset the functional block.

6. A method for detecting an error comprising:
   comparing, for each of at least a plurality of functional blocks in an integrated circuit, a hardwired reference value to a corresponding predetermined value, wherein a predetermined value circuit provides the corresponding predetermined value;
   generating an error indication, on a per functional block basis, based on the comparison that results in a difference between the hardwired reference value and the corresponding predetermined value for a given functional block; and
   for at least one of the functional blocks that caused the error indication, resetting the corresponding predetermined value to a value that matches the hardwired reference value in response to performing a recovery process to recover the at least one of the functional blocks that caused the error indication.

7. The method of claim 6
   wherein each predetermined value is the same value as a corresponding hardwired reference value during normal operation and
   wherein generating the error indication based on the comparison comprises generating the error indication when a predetermined value and corresponding hardwired reference value do not match.

8. The method of claim 6 wherein the method further comprises performing the recovery process to recover the at least one of the functional blocks in response to the generated error indication associated with the at least one of the functional blocks.

9. The method of claim 8 wherein the error indication comprises an interrupt and wherein performing the recovery process to recover a functional block comprises generating recovery control information to reset the functional block.

10. An integrated circuit comprising:
    a circuit for detecting an error comprising:
    a hardwired reference value circuit that provides a hardwired value;
    a corresponding predetermined med value circuit that provides a predetermined value;

comparator logic, operatively coupled to the hardwired reference value circuit and the corresponding predetermined value circuit, and operative to compare a hardwired reference value to a corresponding predetermined value; and error indication logic operative to generate an error indication based on the comparison that detects a difference between the hardwired reference value and the predetermined value.

11. The integrated circuit of claim 10 wherein the predetermined value is the same value as the hardwired reference value during normal operation and wherein the error generation logic generates the error indication when the predetermined value and the hardwired reference value do not match.

12. The integrated circuit of claim 10 comprising reset logic operatively responsive to recovery control information and operative to reset the predetermined value to a value that matches the corresponding hardwired reference value in response to recovery control information.

13. The integrated circuit of claim 10 comprising a plurality of functional blocks wherein each of the plurality of functional blocks comprises a respective circuit for detecting and comprising multi-functional block error detection status logic containing data representing which of the plurality of functional blocks detected an event based on respective circuits for detecting the error event.

14. A portable device comprising:

a first processor comprising a circuit for detecting an error comprising:

a hardwired reference value circuit that provides a hardwired value;

a corresponding predetermined value circuit that provides a predetermined value circuit;

comparator logic, operatively coupled to the hardwired reference value circuit and the corresponding predetermined value circuit, and operative to compare a hardwired reference value to a corresponding predetermined value; and error indication logic operative to generate an error indication in response to a detected change in the predetermined, value;

a second processor, operatively coupled to the first processor, comprising:

error recovery logic operatively responsive to the error indication and operative to perform a recovery process to recover at least one of the entire first processor or at least one functional block in the first processor in response to the generated error indication.

15. The device of claim 14 wherein the error indication comprises an interrupt and wherein performing the recovery process to recover a functional block comprises generating recovery control information to reset the functional block.

16. The device of claim 14 wherein the predetermined value is the same value as the hardwired reference value during normal operation and wherein the error generation logic generates the error indication when the predetermined value and the hardwired reference value do not match.

17. The device of claim 14 comprising reset logic operatively responsive to recovery control information and operative to reset the predetermined value to a value that matches the corresponding hardwired reference value in response to recovery control information.

18. The device of claim 14 wherein the first processor comprises a plurality of functional blocks wherein each of the plurality of functional blocks comprises a respective circuit for detecting an error and wherein the first processor comprises multifunctional block error detection status logic containing data representing which of the plurality of functional blocks detected an error based on respective circuits for detecting the error.

* * * * *